(12) United States Patent
Baltuch

(10) Patent No.: US 7,918,400 B2
(45) Date of Patent: Apr. 5, 2011

(54) SYSTEM AND METHOD FOR ACCESSING INFORMATION OF THE WEB

(75) Inventor: Edmund George Baltuch, Westmount (CA)

(73) Assignee: Huron Project Management Inc., Montreal (CA)

( * ) Notice: Subject to any disclaimer, the term of this patent is extended or adjusted under 35 U.S.C. 154(b) by 743 days.

(21) Appl. No.: 11/675,344

(22) Filed: Feb. 15, 2007

(65) Prior Publication Data

US 2008/0197184 A1    Aug. 21, 2008

(51) Int. Cl.
G06K 7/10    (2006.01)

(52) U.S. Cl. ............... 235/472.01; 235/462.01

(58) Field of Classification Search .............. 235/472.01, 235/472.02, 472.03, 454, 375, 383, 382, 235/462.01–462.25
See application file for complete search history.

(56) References Cited

U.S. PATENT DOCUMENTS

| | | | | |
|---|---|---|---|---|
| 5,640,193 A * | 6/1997 | Wellner | | 725/100 |
| 6,665,392 B1 * | 12/2003 | Wellner et al. | | 379/204.01 |
| 6,708,208 B1 * | 3/2004 | Philyaw | | 709/223 |
| 6,827,273 B2 * | 12/2004 | Wilz et al. | | 235/472.01 |
| 7,314,178 B2 * | 1/2008 | Rines et al. | | 235/472.01 |
| 2002/0017566 A1 * | 2/2002 | Knowles | | 235/472.01 |
| 2005/0139680 A1 * | 6/2005 | Anttila et al. | | 235/462.46 |
| 2006/0029296 A1 * | 2/2006 | King et al. | | 382/313 |
| 2006/0061806 A1 * | 3/2006 | King et al. | | 358/1.15 |
| 2006/0098899 A1 * | 5/2006 | King et al. | | 382/305 |
| 2007/0069030 A1 * | 3/2007 | Sauerwein et al. | | 235/462.46 |
| 2007/0215685 A1 * | 9/2007 | Self et al. | | 235/375 |
| 2009/0176526 A1 * | 7/2009 | Altman | | 455/556.1 |

OTHER PUBLICATIONS

U.P.C. Symbol Specifications manual, Uniform Code Council Inc., (see web site: http://www.export911.com/e911/coding/coding.htm).

* cited by examiner

*Primary Examiner* — Thien M Le
(74) *Attorney, Agent, or Firm* — Goudreau Gage Dubuc; Gwendoline Bruneau

(57) ABSTRACT

A system and a method for acquiring information on a product, comprising an Internet unit and a communication device, interacting with the Internet unit; wherein the communication device comprises a bar code symbol reader, the bar code symbol reader reading digital code symbologies on the product, the communication device requests information to the Internet unit using the digital code symbologies, and the communication device makes available information returned in response by the Internet unit.

10 Claims, 2 Drawing Sheets

SYSTEM AND METHOD FOR ACCESSING INFORMATION OF THE WEB

FIELD OF THE INVENTION

The present invention relates to a system and a method for accessing information of the web. More specifically, the present invention is concerned with using symbologies on goods to search the World Wide Web to acquire further product information.

BACKGROUND OF THE INVENTION

In the field of marking applied to products for purposes of identification of the products, bar codes and high-density symbologies have been used since the 1950s. They are generally used by manufacturers, distributors and retailers for inventory for example.

In the 1990s some barcode reader manufacturers began working with digital cameras to capture barcodes, both linear and 2D. That technology has since been perfected and now often surpasses laser scanners in performance and reliability. More recently, off-the-shelf digital cameras now have enough resolution to capture both 1D and 2D barcodes. Increasingly companies are looking to incorporate barcode scanning software into cameraphones.

There is still a need in the art for a system and method for accessing information of the web.

SUMMARY OF THE INVENTION

More specifically, in accordance with the present invention, there is provided a system for acquiring information on a product, comprising an Internet unit and a communication device, interacting with the Internet unit; wherein the communication device comprises a bar code symbol reader, the bar code symbol reader reading digital code symbologies on the product, the communication device requests information to the Internet unit using the digital code symbologies, and the communication device makes available information returned in response by the Internet unit.

There is further provided a method for accessing information on a product, comprising the steps of: providing a web-enabled personal digital assistant with a component reading bar codes symbology; reading a bar code symbology of the product with the personal digital assistant; and connecting to websites related to the product on the Internet by using the bar code symbology of the product.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

There is generally provided a system and a method using symbologies on goods to search the World Wide Web to acquire further product information.

Figure 1:
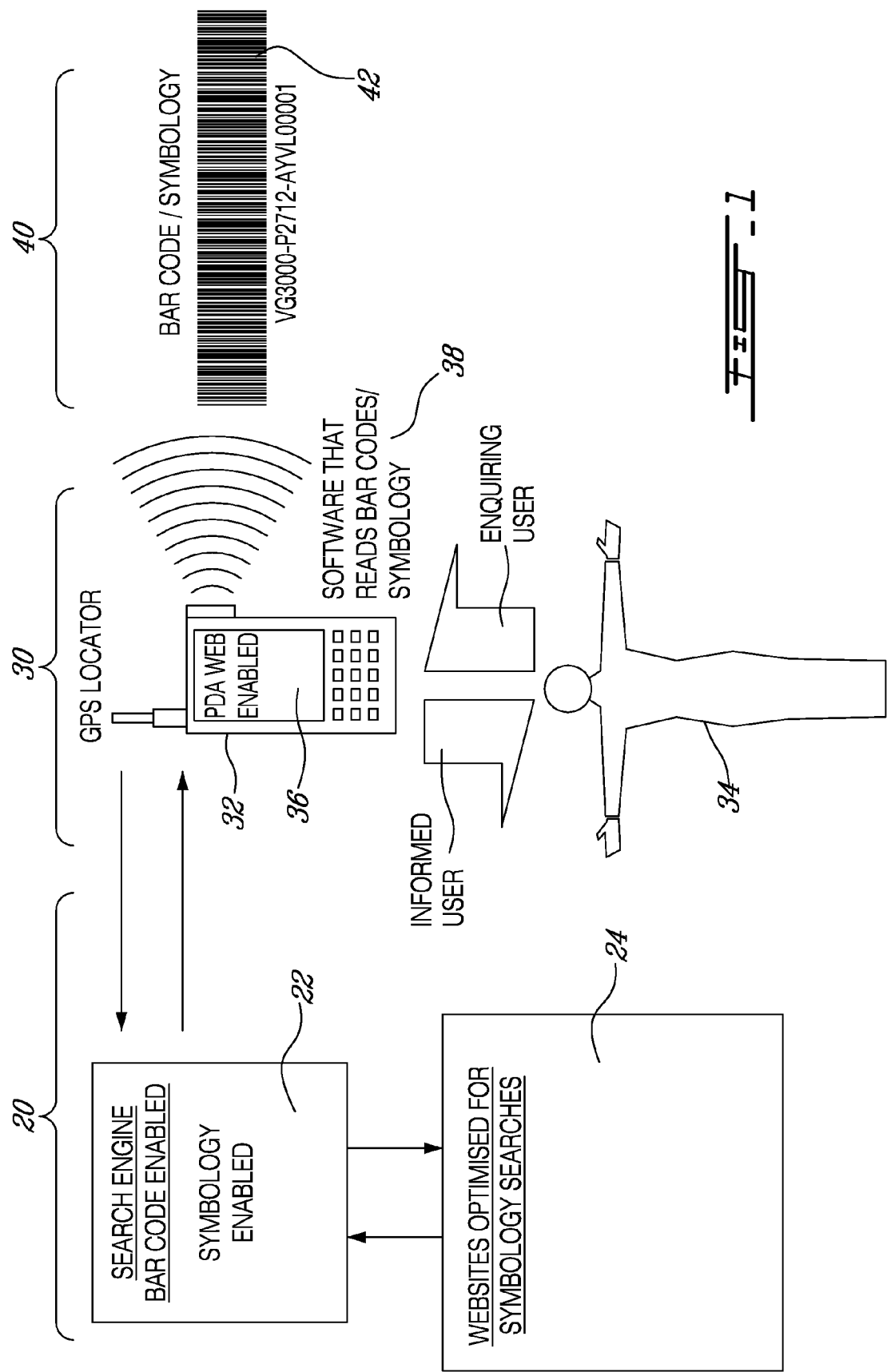
FIG. 1 is a layout of a system according to an embodiment of an aspect of the present invention.

As illustrated in FIG. 1 of the appended drawings, a system according to an embodiment of a first aspect of the present invention generally comprises an Internet unit 20, a user unit 30 and a product unit 40.

The Internet unit 20 provides websites 24 that are searchable using a search engine 22. The present search engine 22 is able to read bar code symbology. It thereby allows using bar code symbology as the search language, to reach the web sites 24.

The web sites 24 are developed for this application. They may be optimized for such symbology searches, in a similar way as current websites are optimized to ensure that target search words direct traffic towards them.

The web sites 24 may be manufacturers micro websites, distributors websites, retailers location specific websites, comparison-shopping websites, opinion type websites, for example.

The user unit 30 comprises a web-enabled mobile communication device 32. A user 34 uses the communication device 32 to interact with the Internet unit 20. The communication device 32 may be a personal digital assistant as known in the art, such as a cell phone, a Palm™, a Blackberry™ etc. . . . for example. It may also be a ready access terminal provided on site by the retailer for example, either stationary, in which case products are to be brought thereto for scanning purposes, or mobile, allowing clients to wonder about carrying it for example.

The communication device 32 comprises a bar code symbol reader, such as an integrated digital camera, as now available on the market, and a software 38 allowing the digital camera to read digital code symbologies, so that the communication device 32 is able to capture digital code symbologies.

The digital code 42 read on an item by the communication device 32 is then sent to the Internet unit 20. The communication device 32 displays the related information received in response from the Internet unit 20, therefore allowing the user 34 rapid and easy access to information. The information sent by the Internet unit 20 may be in a format designed for use on a small screen 36, designed for Palm™ OS for example, or for Windows™ etc., as known in the art.

The user unit 30 may further comprise a GPS locator, as will be described hereinbelow.

Thus, the user unit 30 is able to read bar code symbology 42 associated with each items of the product unit 40. The bar code symbology 42 typically originates from, or is used by, the manufacturer, the distributor, and the retailer of the product for example.

Barcodes can be read by optical scanners (barcode readers) or scanned from an image by special software. Since practically every item purchased from a grocery store, department store, and mass merchandiser has a barcode on it, this existing bar code represents an interesting representation. Other types of representation of information on a product, or of automatic identification and data capture, may be used, such as for example QR Codes. which are most common in Japan, and are currently the most popular type of two dimensional code in Japan. Obviously, a visual format of the representation allows the user to easily locate it on a product for example, for reading purposes. However, other formats of representation may be contemplated.

Figure 2:
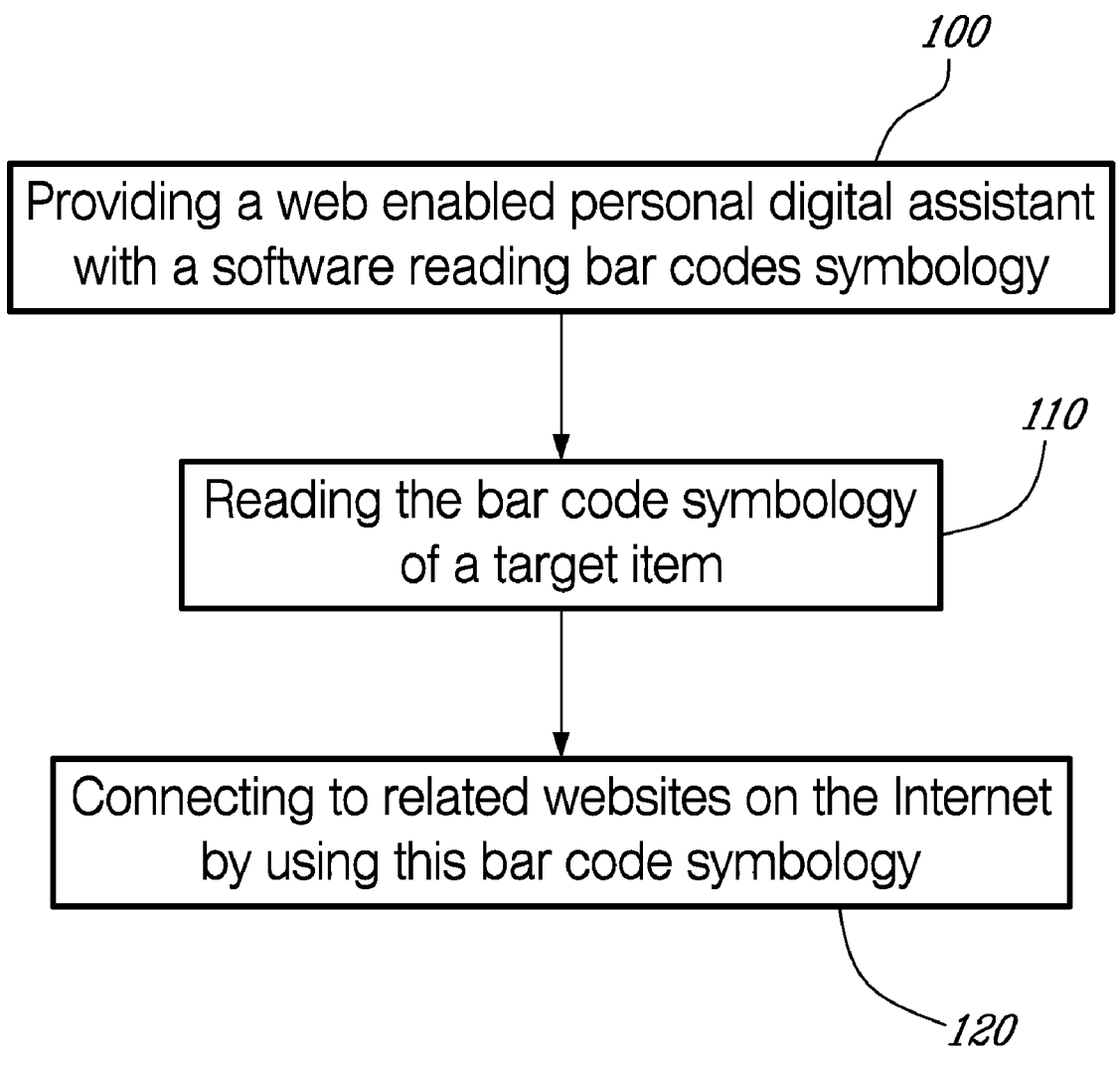
FIG. 2 is a flowchart of a method according to an embodiment of another aspect of the present invention.

According to an embodiment of a second aspect of the present invention illustrated in FIG. 2 of the appended drawings, a method for accessing information data on a product generally comprises the steps of: providing a web enabled personal digital assistant with a software reading bar codes symbology (step 100); reading the bar code symbology of a target product (step 110); and connecting to related websites on the Internet by using this bar code symbology (step 120).

Web browsers use the symbology to search World Wide Web portals designed to understand and return information based on the digitized symbologies.

A user is thus directed to websites providing product information, which enables him to compare pricing of the target product at different retail points of sale for example. Correspondingly, his leverage in terms of buying information and negotiating strength is increased.

For example, a potential retail shopper is in Store A at location X looking to purchase product Alpha. By scanning the UPC (Uniform Product Code) bar code already on the product Alpha with a web-enabled mobile communication device, the potential retail shopper starts a search of the net for sites that are set up to respond to the UPC code and reaches a website providing further product information, potentially competitive pricing from other retailers and potentially competitive information from other manufacturers of similar product lines.

This type of search is similar to that already available to the user utilizing words to describe the same products but now using simple and available bar codes or other symbologies.

By enabling a GPS feature of the personal mobile communication device, direct information, pertinent and special to the particular location where the user is, may be provided to the user.

For example, given a user in Paris, France the information sent will be different from the information sent to a user located in St. Louis, Mo. GPS systems indeed allow locating the requester of information and therefore tailoring the provided information to suit that particular location.

It is further to be noted that, in the case when the GPS enabled-mobile communication device indicates that the requester of information is located in store A at geographic location X, Store A would have a vested interest in assuring that the first information sent back to the enquirer be their website or information.

On the first hand, the present invention provides a consumer, for example, whether shopping for a television set or a bottle of wine, for example, with a streamlined efficient method to assess and gain information and competitive leverage in a pursuit of efficient purchasing.

On the other hand, the present invention provides product manufacturers and retailers, for example, with a medium to access potential clients directly at a point of sales when decisions to purchase are about to take place.

A number of applications may be contemplated. For example, the user may be a supervisor on a construction site remote from any central office. Using a bar code on each piece of material that is shipped in, the supervisor is enabled to identify each piece and to access immediately a range of information relating to each piece, including of course inventory-type information, but also precious time-saving data such as the location on the site where each piece is intended to be, specific measures to be taken when handling each piece etc. . . . Furthermore, the supervisor may be able to update the information he accesses to, whereby the progress on the construction site may be monitored in real time from a remote central office.

Although the present invention has been described hereinabove by way of specific embodiments thereof, it can be modified, without departing from the spirit and nature of the subject invention as defined in the appended claims.

The invention claimed is:

1. A consumer advising system for acquiring information on a product identified by a pre-existing digital code, comprising:
   an Internet unit comprising websites that are set up to respond to pre-existing digital code symbology as the search language and a search engine being able to read digital code symbology; and
   a communication device, comprising a digital code symbol reader and a screen, said communication device interacting with said Internet unit;
   said digital code symbol reader reading the digital code on the product, said communication device sending said digital code to said Internet unit, said search engine searching corresponding websites using said digital code among said set up websites of the Internet unit and said communication device displaying information about said product available on said corresponding set up websites.

2. The system of claim 1, wherein said websites of the Internet unit are optimized for symbology searches.

3. The system of claim 1, wherein said communication device is a web-enabled personal digital assistant.

4. The system of claim 1, wherein said communication device comprises a digital camera and a software allowing said digital camera to read digital code symbologies.

5. The system of claim 1, wherein information returned by the Internet unit is in a format designed for display on said screen.

6. The system of claim 1, wherein said communication device comprises a GPS locator.

7. A method for accessing information, available on internet websites, on a product, comprising the steps of:
   providing websites that are set up to respond to a pre-existing digital code technology;
   providing a web-enabled personal digital assistant with a component reading bar codes symbology;
   reading a pre-existing bar code on the product with the personal digital assistant; and
   using the bar code read on the product as the search language for locating, among said set up websites, websites providing information related to the product.

8. The method of claim 7, wherein said step of providing a web-enabled personal digital assistant comprises providing a web-enabled personal digital assistant including a digital camera and a software allowing the digital camera to read digital code symbologies.

9. The method of claim 7, further comprising receiving information from the located websites and displaying the information on a screen of the personal digital assistant.

10. The method of claim 7, further comprising connecting a GPS locator to the personal digital assistant.

\* \* \* \* \*